United States Patent
Tsuchiya

(10) Patent No.: US 8,531,540 B2
(45) Date of Patent: Sep. 10, 2013

(54) MOBILE TERMINAL, CONTROL METHOD OF SAME, CONTROL PROGRAM OF SAME, AND COMPUTER-READABLE STORAGE MEDIUM STORING THE CONTROL PROGRAM

(75) Inventor: Shinichi Tsuchiya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 446 days.

(21) Appl. No.: 12/602,975

(22) PCT Filed: May 26, 2008

(86) PCT No.: PCT/JP2008/059664
§ 371 (c)(1),
(2), (4) Date: Dec. 3, 2009

(87) PCT Pub. No.: WO2008/149709
PCT Pub. Date: Dec. 11, 2008

(65) Prior Publication Data
US 2010/0177204 A1    Jul. 15, 2010

(30) Foreign Application Priority Data
Jun. 4, 2007    (JP) .................................. 2007-148285

(51) Int. Cl.
*H04N 5/228* (2006.01)
*G06K 9/00* (2006.01)

(52) U.S. Cl.
USPC ....................................... 348/222.1; 382/165

(58) Field of Classification Search
None
See application file for complete search history.

(56) References Cited

U.S. PATENT DOCUMENTS

| 5,181,062 A | 1/1993 | Kazumi |
| 5,446,518 A | 8/1995 | Kazumi |
| 6,301,440 B1 * | 10/2001 | Bolle et al. .................... 396/128 |
| 6,726,094 B1 | 4/2004 | Rantze et al. |
| 2002/0018138 A1 | 2/2002 | Yoshiro |
| 2003/0062419 A1 | 4/2003 | Ehrhart et al. |
| 2006/0043193 A1 | 3/2006 | Brock |
| 2010/0096461 A1 * | 4/2010 | Kotlarsky et al. ........ 235/462.11 |

FOREIGN PATENT DOCUMENTS

| EP | 1507196 A2 | 2/2005 |
| EP | 1507196 A2 * | 2/2005 |
| JP | 2-311830 A | 12/1990 |
| JP | 5-120466 A | 5/1993 |
| JP | 2001-333325 A | 11/2001 |
| JP | 2003-319405 A | 11/2003 |
| JP | 2004-228784 A | 8/2004 |
| JP | 2004-228785 A | 8/2004 |
| JP | 2006-186717 A | 7/2006 |
| WO | WO 2005/124657 A1 | 12/2005 |

* cited by examiner

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

A mobile terminal (1) of the present invention includes an image capturing section (19), an image obtaining section (22) for obtaining a subject image captured by the image capturing section (19), and an image capturing mode determination section (24) for determining which one of a plurality of image capturing modes is suitable for the subject image. The image capturing section (19) captures the subject in an image capturing mode determined to be suitable for the subject by the image capturing mode determination section (24). This makes it possible to provide a mobile terminal which makes it possible to switch to an image capturing mode suitable for a subject.

10 Claims, 11 Drawing Sheets

F I G. 3
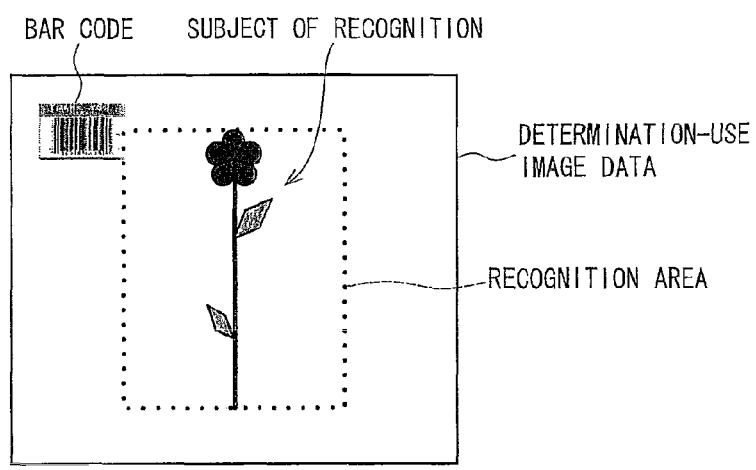

FIG. 4

| SEQUENCE | IMAGE CAPTURING MODE | IMAGE CAPTURING MODE DETERMINATION INFORMATION | |
|---|---|---|---|
| 1 | CHARACTER READING MODE | STANDARD PATTERN OF CHARACTER OR RELATIVE POSITION OF FEATURE POINT OF CHARACTER |  |
| 2 | BAR CODE READING MODE (ONE DIMENSION) | FEATURE LINE AND START/STOP CHARACTER | 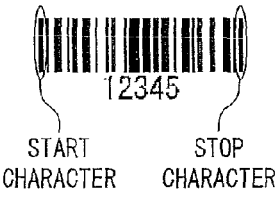 START CHARACTER    STOP CHARACTER |
| 3 | BAR CODE READING MODE (TWO DIMENSION) | POSITION DETERMINATION PATTERN | POSITION DETERMINATION PATTERN 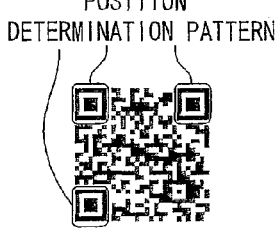 |

MOBILE TERMINAL, CONTROL METHOD OF SAME, CONTROL PROGRAM OF SAME, AND COMPUTER-READABLE STORAGE MEDIUM STORING THE CONTROL PROGRAM

BACKGROUND OF THE INVENTION

1. Field of the Invention

The present invention relates to (i) a mobile terminal which recognizes a type of a subject so as to automatically switch to an image capturing mode suitable for the subject, (ii) a control method of the mobile terminal, (iii) a control program of the mobile terminal, and (iv) a computer-readable storage medium storing the control program.

2. Description of the Related Art

Conventionally, mobile terminals having image capturing means for capturing an image of a subject, e.g., (i) portable phones such as PDCs (Personal Digital Cellular) and PHSs (Personal Handyphone System), and (ii) portable information terminal devices such as PDAs (Personal Digital Assistant), have allowed a user to select one of a plurality of image capturing modes in accordance with a subject. Examples of the plurality of image capturing modes are a character reading mode of recognizing a character, a bar code reading mode of recognizing a bar code, and a digital camera mode of capturing an image of a person and/or a landscape.

Unfortunately, conventional mobile terminals have required a user to manually select one of the image capturing modes after the image capturing means is started. Furthermore, in general, the conventional mobile terminals start in a default image capturing mode after the image capturing means is started, or start in an image capturing mode which has been previously used. Accordingly, a user has been required to manually select an image capturing mode in a case where the user would like to capture an image of a subject in an image capturing mode which is different from one in which the image capturing means is started. This has made user operation complicated.

As a solution to this, each of Patent Literatures 1 through 4 discloses an art for allowing easy switching of a plurality of image capturing modes.

For example, Patent Literature 1 discloses an art as below. An image of one of sample screens of scenes such as a night view, a sport, and a macro is captured by a digital camera. Each of the sample screens is combined with a bar code or the like. The digital camera automatically selects an image capturing mode corresponding to the sample screen thus captured.

Patent Literature 2 discloses an art as below. An image of one of a plurality of bar codes is captured by a digital camera. The plurality of bar codes are removably attached to a strap of the digital camera. The digital camera automatically selects an image capturing mode in accordance with a type of data thus read in.

Patent Literature 3 discloses an art as below. A bar code containing operation mode information is captured by a camera block of a video camcorder so that the video camcorder automatically selects a desired operation mode in accordance with data of the bar code thus captured. Patent Literature 4 discloses an art as below. A bar code indicative of, e.g., aperture information and shutter speed information is read by a code reading apparatus so that a program for causing a camera to operate in accordance with a code signal thus read is automatically set in the camera.

CITATION LIST

Patent Literature 1
Japanese Patent Application Publication, Tokukai, No. 2004-228784 A (Publication Date: Aug. 12, 2004)

Patent Literature 2
Japanese Patent Application Publication, Tokukai, No. 2004-228785 A (Publication Date: Aug. 12, 2004)

Patent Literature 3
Japanese Patent Application Publication, Tokukaihei, No. 5-120466 A (Publication Date: May 18, 1993)

Patent Literature 4
Japanese Patent Application Publication, Tokukaihei, No. 2-311830 A (Publication Date: Dec. 27, 1990)

SUMMARY OF INVENTION

According to each of the arts disclosed in the Patent Documents 1 through 3, as described above, the image capturing means captures an image of a bar code containing one piece of image capturing mode information which indicates one of a plurality of image capturing modes, in order that one image capturing mode is selected. According to the art disclosed in Patent Literature 4, as described above, a bar code corresponding to a program for operating a camera is read so that a desired program is automatically set in the camera.

In other words, the arts disclosed in Patent Literatures 1 through 4 require preparation of image capturing modes or bar codes corresponding to programs for operating a camera. This leads to an increase in manufacturing cost. Moreover, according to the arts disclosed in Patent Literatures 1 through 4, a user is required to read, by the image capturing means or the like, a bar code corresponding to a desired image capturing mode or to a program for operating a camera in a desired way. That is, a complex user operation is required.

The present invention was made in view of the problems. An object of the present invention is to provide (i) a mobile terminal which allows easy switching to an image capturing mode suitable for a subject, (ii) a control method of the mobile terminal, (iii) a control program of a mobile terminal, and (iv) a computer-readable storage medium storing the control program.

In order to attain the object, a mobile terminal of the present invention includes: image capturing means; image obtaining means for obtaining a subject image captured by the image capturing means; and image capturing mode determination means for determining which one of a plurality of image capturing modes is suitable for the subject image thus obtained by the image obtaining means, the image capturing means capturing a subject image in an image capturing mode determined to be suitable by the image capturing mode determination means.

The arrangement makes it possible to automatically recognize a subject and easily switch an image capturing mode of the image capturing means to one suitable for the subject, even in a case where the subject is one, such as a character, a bar code, or a color code, which cannot be recognized without using a special image capturing mode.

Specifically, the mobile terminal of the present invention operates as below. The image obtaining means obtains a subject image captured by the image capturing means. The image capturing mode determination means determines which one of the plurality of image capturing modes is suitable for the subject image obtained by the image obtaining means. The image capturing means captures a subject image in an image capturing mode determined to be suitable for the subject by the image capturing mode determination means.

Thus, the image capturing mode determination means of the mobile terminal of the present invention can determine which one of the plurality of image capturing modes is suitable for the subject image obtained by the image obtaining means. This allows the image capturing means to capture a subject image in an image capturing mode suitable for a subject.

Examples of the plurality of image capturing modes encompass a character reading mode of recognizing a character, a bar code reading mode of recognizing a one-dimensional bar code and a two-dimensional bar code, a digital camera mode of capturing an image of a person, a landscape, or the like, and a color code reading mode of recognizing a color code.

For a fuller understanding of the nature and advantages of the invention, reference should be made to the ensuing detailed description taken in conjunction with the accompanying drawings.

BRIEF DESCRIPTION OF DRAWINGS

FIG. 3 is a view illustrating a recognition area in determination-use image data.

FIG. 4 is a view illustrating an image capturing mode determination table for correlating image capturing modes with pieces of image capturing mode determination information, indicative of features of image data, for classifying determination-use image data into one of the image capturing modes.

| Reference Signs List | |
|---|---|
| 1 | Mobile terminal |
| 10 | Antenna section |
| 11 | Wireless processing section |
| 12 | Sound processing section |
| 13 | Sound input section |
| 14 | Sound output section |
| 15 | Data processing section |
| 16 | Operation section |
| 17 | Memory section |
| 18 | Display section (notification means) |
| 19 | Image capturing section |
| 20 | Power supply section |
| 21 | Main control section |
| 22 | Image obtaining section (image obtaining means) |
| 23 | Recognition area cutout section |

| Reference Signs List | |
|---|---|
| 24 | Image capturing mode determination section (image capturing mode determination means) |
| 25 | Image capturing mode switching section (first image capturing mode switching means, second image capturing mode switching means, and post-capturing processing switching means) |
| 26 | Post-capturing processing section (post-capturing processing means) |
| 27 | Character specifying section |
| 28 | One-dimensional bar code specifying section |
| 29 | Two-dimensional bar code specifying section |
| 30 | Character reading mode post-processing section |
| 31 | Bar code reading mode post-processing section |
| 32 | Digital camera mode post-processing section |

DETAILED DESCRIPTION OF THE INVENTION

The following describes the present invention in more detail by showing embodiments and comparative examples. However, the present invention is not limited to the embodiments and comparative examples.

The following describes one embodiment of the preset invention, with reference to FIGS. 1 through 11.

[Overall Arrangement of Mobile Terminal]

Figure 2:
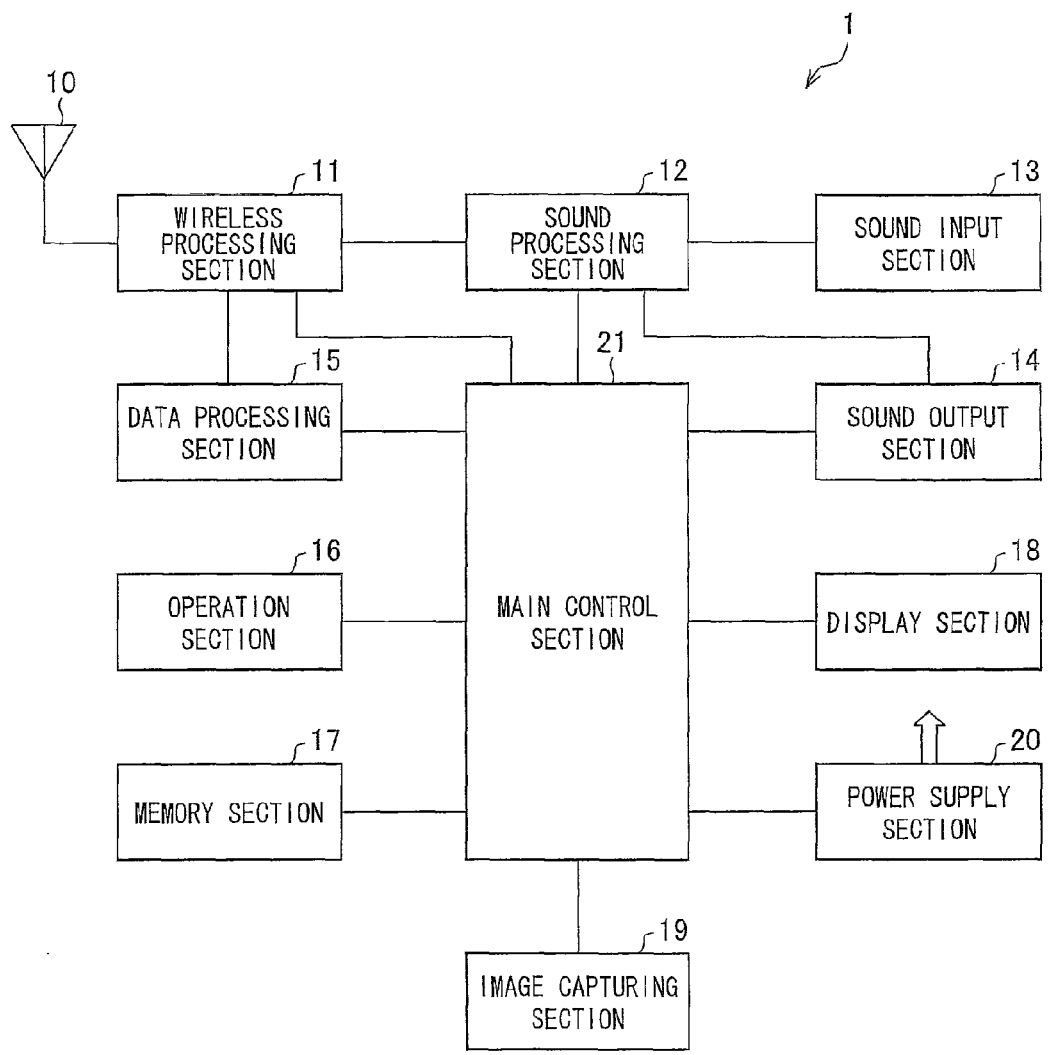
FIG. 2 is a block diagram illustrating an arrangement of the main part of the mobile terminal.

The following describes an overall arrangement of a mobile terminal 1 of the present invention, with reference to FIG. 2. FIG. 2 is a block diagram illustrating a schematic arrangement of a whole of the mobile terminal 1.

The mobile terminal 1 of the present embodiment includes an antenna section 10, a wireless processing section 11, a sound processing section 12, a sound input section 13, a sound output section 14, a data processing section 15, an operation section 16, a memory section 17, a display section (notification means) 18, an image capturing section (image capturing means) 19, a power supply section 20, and a main control section 21.

The mobile terminal 1 is, e.g., a portable phone or a PDA (Personal Data Assistant), and is a portable terminal device.

As illustrated in FIG. 2, components described above are each connected to the main control section 21 directly or indirectly in the mobile terminal 1. Components other than the main control section 21 are those for carrying out various functions of the mobile terminal 1. Specifically, the mobile terminal 1 is arranged so that the main control section 21 controls the various functions carried out by the components other than the main control section 21.

The following describes, in detail, the components for carrying out the various functions of the mobile terminal 1. The antenna section 10 transmits an electric wave to outside of the mobile terminal 1 and receives an electric wave from the outside.

The wireless processing section 11 converts data received from the sound processing section 12 or from the data processing section 15 into a wireless signal having a format suitable for wireless transmission, and transmits the wireless signal thus converted to the outside via the antenna section 10. The wireless processing section 11 converts the wireless signal received from the outside via the antenna section 10 into data having its original format, and transmits the data thus converted to the sound processing section 12 or to the data processing section 15. Specifically, the wireless processing section 11 carries out channel codec processing, baseband signal processing, modulation and demodulation of data, RF (Radio Frequency) processing, etc.

The sound processing section 12 converts a sound signal received from the sound input section 13 into predetermined sound data so as to transmit the predetermined sound data to the wireless processing section 11, and converts sound data received from the wireless processing section 11 into a sound signal so as to transmit the sound signal to the sound output section 14. Specifically, the sound processing section 12 includes an A/D converter, a D/A converter, an amplifier, and a sound codec circuit.

The sound input section 13 converts a sound wave inputted from the outside into a sound signal which is an electric signal so as to transmit the sound signal to the sound processing section 12. Specifically, the sound input section 13 includes a microphone.

The sound output section 14 converts a sound signal received from the sound processing section 12 into a sound wave so as to output the sound wave to the outside. Specifically, the sound output section 14 includes a speaker, an earphone, a connector for sound output, etc.

The data processing section 15 encodes data received from the main control section 21 into data having a predetermined format so as to transmit the data to the wireless processing section 11, and decodes data received from the wireless processing section 11 so as to transmit data thus decoded to the main control section 21.

The operation section 16 generates operation data upon user operation of input devices such as main operation buttons provided on a surface of the mobile terminal 1, so as to transmit the operation data to the main control section 21. Examples of the input devices encompass a touch panel in addition to a button switch. In the present embodiment, the operation section 16 includes (i) a determination start button which is pushed down by a user so that an image capturing mode determination process is started, and (ii) a shutter button which is pushed down by a user so that an image of a subject is captured.

The memory section 17 stores various data and a program. Examples of the memory section 17 encompass (i) a ROM (Read Only Memory) which is a read-only semiconductor memory for storing fixed data such as (I) a program required for the main control section 21 to operate and (II) communication control data, and (ii) a RAM (Random Access Memory) which is a so-called working memory for temporarily storing data related to bar code recognition and to communication, data used in calculation, a calculation result, etc.

The memory section 17 can be realized as a rewritable nonvolatile memory such as a flash memory or an EEPROM, and may store (i) text data, bar code data, and photographic data which are captured by the image capturing section 19 of the mobile terminal 1, and (ii) an image capturing mode determination table which is referred in determination of an image capturing mode by the main control section 21.

The display section 18 receives data to be displayed indicative of an image, text, a moving image, etc., and displays the image, the text, the moving image, etc. in accordance with the data to be displayed thus received. The data to be displayed is information corresponding to one screen image to be drawn on a display screen of the display section 18.

The image capturing section 19 captures an image of a subject so as to generate data indicative of an image, a moving image, or the like. Specifically, for example, the image capturing section 19 is arranged so as to include (i) an image pickup element such as a CCD (Charge Coupled Device) or a CMOS (Complementary Metal-Oxide Semiconductor) which convert light from a subject into an electric signal, and (ii) a video processing circuit which converts an electric signal received from the image pickup element into digital data indicative of RGB. The image capturing section 19 transmits data thus generated to the main control section 21.

The power supply section 20 supplies a proper electric power to the components in the mobile terminal 1. The power supply section 20 includes, e.g., a rechargeable secondary battery such as a lithium-ion battery, and a power supply circuit.

The main control section 21 performs overall control of the components in the mobile terminal 1. A function of the main control section 21 is realized by causing a CPU (Central Processing Unit) to execute a program stored in a memory device such as a RAM or a flash memory.

[Arrangement of Main Part of Mobile Terminal]

With reference to FIG. 1 and FIGS. 3 through 11, the following describes a main arrangement, of the present invention, in the overall arrangement of the mobile terminal 1 illustrated in FIG. 2.

First Embodiment of Main Part of Mobile Terminal 1

Figure 1:
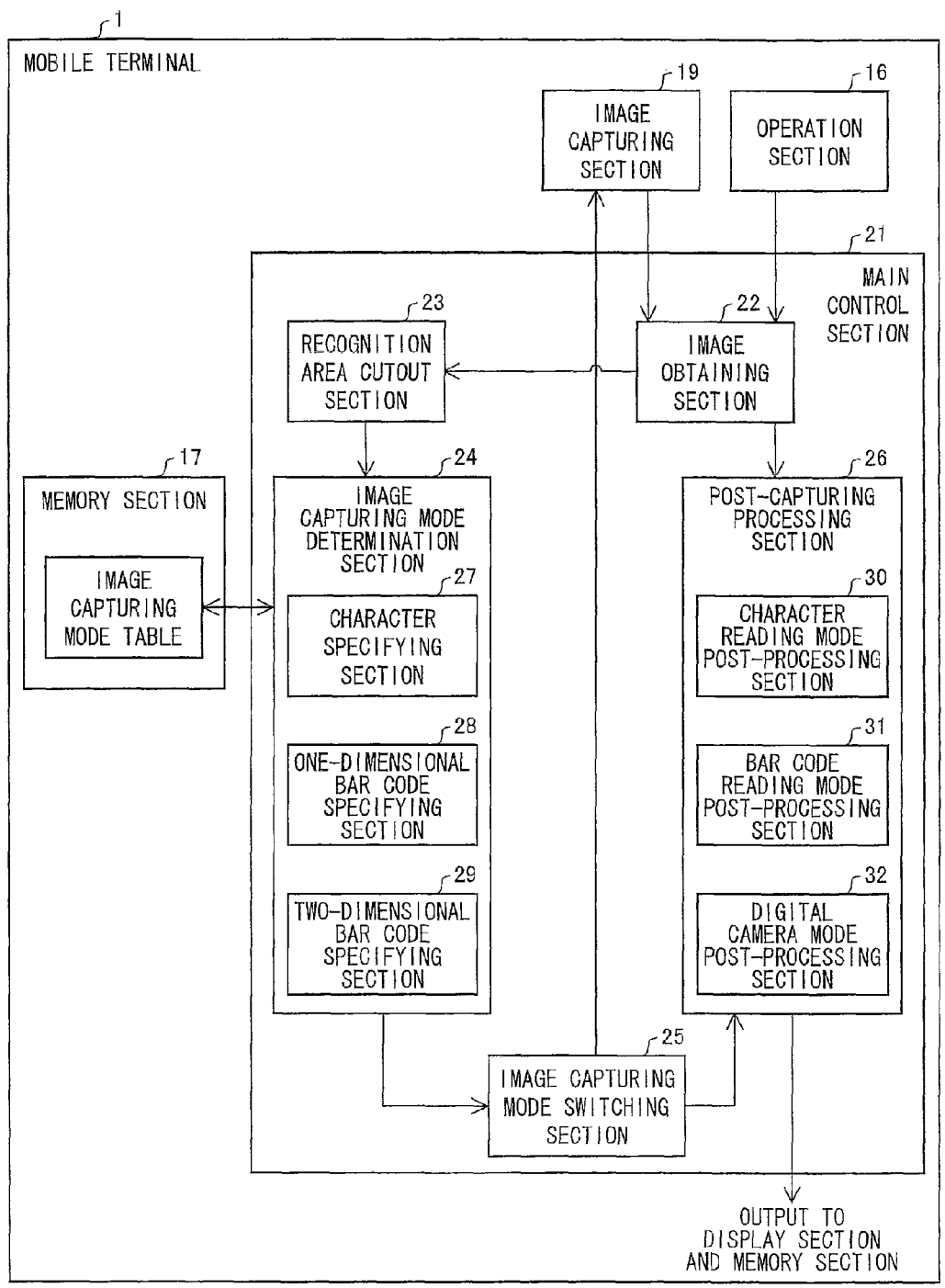
FIG. 1 is a block diagram illustrating an arrangement of a first embodiment of a main part of a mobile terminal.

The following describes a first embodiment of a main part of the mobile terminal 1, with reference to FIG. 1, and FIGS. 3 through 7. FIG. 1 is a block diagram illustrating an arrangement of the first embodiment of the main part of the mobile terminal 1.

The mobile terminal 1 of the present embodiment includes, at least, an operation section 16, a memory section 17, an image capturing section 19, an image obtaining section (image obtaining means) 22, a recognition area cutout section (recognition area cutout means) 23, an image capturing mode determination section (image capturing mode determination means) 24, an image capturing mode switching section (first image capturing mode switching means, second image capturing mode switching means, and post-capturing processing switching means) 25, and a post-capturing processing section (post-capturing processing means) 26. The image obtaining section 22, the recognition area cutout section 23, the image capturing mode determination section 24, the image capturing mode switching section 25, and the post-capturing processing section 26 are included in the main control section 21.

In the mobile terminal 1 of the present embodiment, in particular, the image capturing section 19 is arranged so as to capture an image of a subject in one image capturing mode selected from a plurality of image capturing modes which are switched in accordance with a subject. In the following description, the plurality of image capturing modes are referred to as the following image capturing modes: a character reading mode of recognizing a character; a bar code reading mode of recognizing a one-dimensional bar code and a two-dimensional bar code; and a digital camera mode of capturing an image of a landscape, a person, or the like. It should be noted that the image capturing modes of the present invention are not limited to the three image capturing modes above but can further encompass another image capturing mode such as a color code reading mode of recognizing a color code.

Table 1 below shows one example of a screen size, an angle of view, a focal length, and a brightness, for each of the following modes: the character reading mode, the bar code reading mode, and the digital camera mode.

TABLE 1

|  | SCREEN SIZE | ANGLE OF VIEW | FOCAL LENGTH | BRIGHTNESS |
|---|---|---|---|---|
| CHARACTER READING MODE | SPECIAL | NARROW | FIXED (SHORT) | +1 (BRIGHT) |
| BAR CODE READING MODE | SPECIAL | NARROW | FIXED (SHORT) | ±0 (NORMAL) |
| DIGITAL CAMERA MODE | QVGA, VGA, ETC. | WIDE | VARIABLE | ±0 (NORMAL) |

The image obtaining section 22 obtains image data from a live view image captured by the image capturing section 19, in a case where the image obtaining section 22 receives, via the operation section 16, a user's pushing down of the determination start button or the shutter button. In the following description, the image data which is obtained by the image obtaining section 22 in a case where the image obtaining section 22 receives, via the operation section 16, a user's pushing down of the determination start button is referred to as determination-use image data. On the other hand, the image data which is obtained by the image obtaining section 22 in a case where the image obtaining section 22 receives, via the operation section 16, a user's pushing down of the shutter button is referred to as captured image data.

The recognition area cutout section 23 cuts out, from determination-use image data obtained by the image obtaining section 22, a predetermined recognition area to be used for determining an image capturing mode. The determination-use image data, from which a recognition area to be used for determining an image capturing mode is cut out, is not limited to image data of an image captured by the image capturing section 19 but can be image data which is stored in the memory section 17 in advance.

The following describes how the recognition area cutout section 23 cuts out a recognition area of determination-use image data, with reference to FIG. 3. FIG. 3 is a view illustrating a recognition area of determination-use image data.

In a case where a whole of determination-use image data obtained by the image obtaining section 22 is used for determining an image capturing mode suitable for a subject, it is difficult to select one image capturing mode if a plurality of subjects corresponding to respective different image capturing modes, e.g., a bar code and a flower illustrated in FIG. 3, are captured in the determination-use image data.

As a solution to this, the recognition area cutout section 23 cuts out, from determination-use image data obtained by the image obtaining section 22, the predetermined recognition area to be used for determining an image capturing mode. With the arrangement, capturing a target subject within the recognition area by using the image capturing section 19 makes it possible to select an image capturing mode suitable for the target subject even if a plurality of subjects corresponding to respective different image capturing modes are captured in the determination-use image data.

The recognition area can be a predetermined area which is displayed by the display section 18. Alternatively, the recognition area can be freely selected by a user after the image obtaining section 22 obtains determination-use image data.

For example, an arrangement can be such that a touch panel (not illustrated) integrated with the display section 18 is provided, and a user directly touches the touch panel so as to specify the recognition area.

The image capturing mode determination section 24 determines which one of the plurality of image capturing modes is suitable for an image within a recognition area cut from determination-use image data by the recognition area cutout section 23. Specifically, with reference to the image capturing mode determination table stored in the memory section 17, the image capturing mode determination section 24 (i) specifies a piece of image capturing mode determination information which matches a feature of an image within a recognition area cut out from determination-use image data by the recognition area cutout section 23, and (ii) selects an image capturing mode corresponding to the piece of image capturing mode determination information thus specified, as an image capturing mode suitable for a subject. The image capturing mode determination section 24 includes a character specifying section 27, a one-dimensional bar code specifying section 28, and a two-dimensional bar code specifying section 29.

As shown in FIG. 4, the image capturing mode determination table stored in the memory section 17 correlates (i) numbers indicating a sequence of determination processes, (ii) the plurality of image capturing modes, i.e.: the character reading mode, the one-dimensional bar code reading mode, and the two-dimensional bar code reading mode, and (iii) pieces of image capturing mode determination information each of which indicates an image data feature to be used for classifying determination-use image data obtained by the image obtaining section 22 into a corresponding one of the plurality of image capturing modes.

In the case of the character reading mode, a corresponding piece of image capturing mode determination information indicates (i) a standard pattern of a character such as a Chinese character, a hiragana character (Japanese syllabary), a katakana character (Japanese syllabary for mainly spelling out words that are foreign to the Japanese), a numeral, or an alphabet, or (ii) a relative position of feature points of such a character. In the case of the one-dimensional bar code reading mode, a corresponding piece of image capturing mode determination information indicates a plurality of feature lines, a start character, and a stop character. In the case of the two-dimensional bar code reading mode, a corresponding piece of image capturing mode determination information indicates position detection patterns.

The character specifying section 27 determines whether or not a feature of an image within a recognition area cut out from determination-use image data by the recognition area cutout section 23 matches a piece of image capturing mode determination information which corresponds to the character reading mode stored in the image capturing mode determination table in the memory section 17. Examples of a method for the determination encompass pattern matching and feature point extraction. The one-dimensional bar code specifying section 28 determines whether or not a feature of an image within a recognition area cut out from determination-use image data by the recognition area cutout section 23 matches a piece of image capturing mode determination information which corresponds to the one-dimensional bar code reading mode stored in the image capturing mode determination table in the memory section 17. Specifically, the one-dimensional bar code specifying section 28 determines whether or not a plurality of distinguishing codes, a distinguishing start character, and a distinguishing stop character are included in the recognition area of the determination-use image data.

The two-dimensional bar code specifying section 29 determines whether or not a feature of an image within a recognition area cut out from determination-use image data by the recognition area cutout section 23 matches a piece of image capturing mode determination information which corresponds to the two-dimensional bar code reading mode stored in the image capturing mode determination table in the memory section 17. Specifically, the two-dimensional bar code specifying section 29 determines whether or not position detection determination patterns are included in the recognition area of the determination-use image data. Examples of a subject of the mobile terminal 1 of the present embodiment encompass a character, a barcode, a color code, a landscape, and a person. Particularly, in the case of a character or a bar code among such subjects, it is necessary to set an image capturing mode not to the digital camera mode for capturing an image of a person, a landscape, or the like, but to the character reading mode or the bar code reading mode, in which a special method for recognizing such a subject.

In the present embodiment, accordingly, the memory section 17 stores the image capturing mode determination table in which the following image capturing modes: the character reading mode of recognizing a character, the one-dimensional bar code reading mode of recognizing a one-dimensional bar code, and the two-dimensional bar code reading mode of recognizing a two-dimensional bar code are correlated with respective pieces of image capturing mode determination information. The image capturing mode determination section 24 selects the digital camera mode of recognizing a subject other than characters and bar codes in a case where the image capturing mode determination section 24 cannot specify, with reference to the image capturing mode determination table, a piece of image capturing mode determination information which matches a feature of determination-use image data.

The arrangement above allows the mobile terminal 1 to select the character reading mode or the bar code reading mode, in which a special recognition method is used, in a case where it is necessary to recognize a subject such as a character or a bar code by a special recognition method.

In a case where a piece of image capturing mode determination information specified by the image capturing mode determination section 24 corresponds to the one-dimensional bar code reading mode or to the two-dimensional bar code reading mode, the image capturing mode determination section 24 selects the bar code reading mode.

The image capturing mode determination section 24 may cause the display section 18 to display an image capturing mode thus selected. Alternatively, the image capturing mode determination section 24 may notify a user of an image capturing mode thus selected, by way of a lamp such as an LED, audio guidance, and/or the like. In other words, the mobile terminal 1 is not limited to the arrangement thus described, provided that the mobile terminal 1 has an arrangement which makes it possible to notify a user of a selected image capturing mode.

The mobile terminal 1 is arranged such that the image capturing mode determination section 24 automatically selects an image capturing mode suitable for a subject. According to the arrangement, unfortunately, the image capturing mode determination section 24 may wrongly select an image capturing mode in a case where, determination-use image data obtained by the image obtaining section 22 contains an unclear character or a landscape containing a character or a bar code.

If the image capturing mode determination section 24 wrongly selects an image capturing mode, an image of a subject is captured in the image capturing mode which is not suitable for the subject, as long as the mobile terminal 1 does not have means which allows a user to check an image capturing mode determined to be suitable for a subject by the image capturing mode determination section 24.

In consideration of this, the image capturing mode determination section 24 causes the display section 18 for displaying information to display an image capturing mode determined to be suitable for a subject by the image capturing mode determination section 24. This allows a user to know which image capturing mode has been selected. This allows a user to halt start of the image capturing section 19, and to perform again determination of an image capturing mode, in a case where the user determines that an image capturing mode determined to be suitable for a subject by the image capturing mode determination section 24 is not suitable for the subject. This makes it possible to select an image capturing mode suitable for a subject.

The image capturing mode switching section 25 switches the image capturing modes of the image capturing section 19, and switches a post-processing mode of the post-capturing processing section 26 to one corresponding to an image capturing mode determined to be suitable for a subject by the image capturing mode determination section 24.

Figure 5:
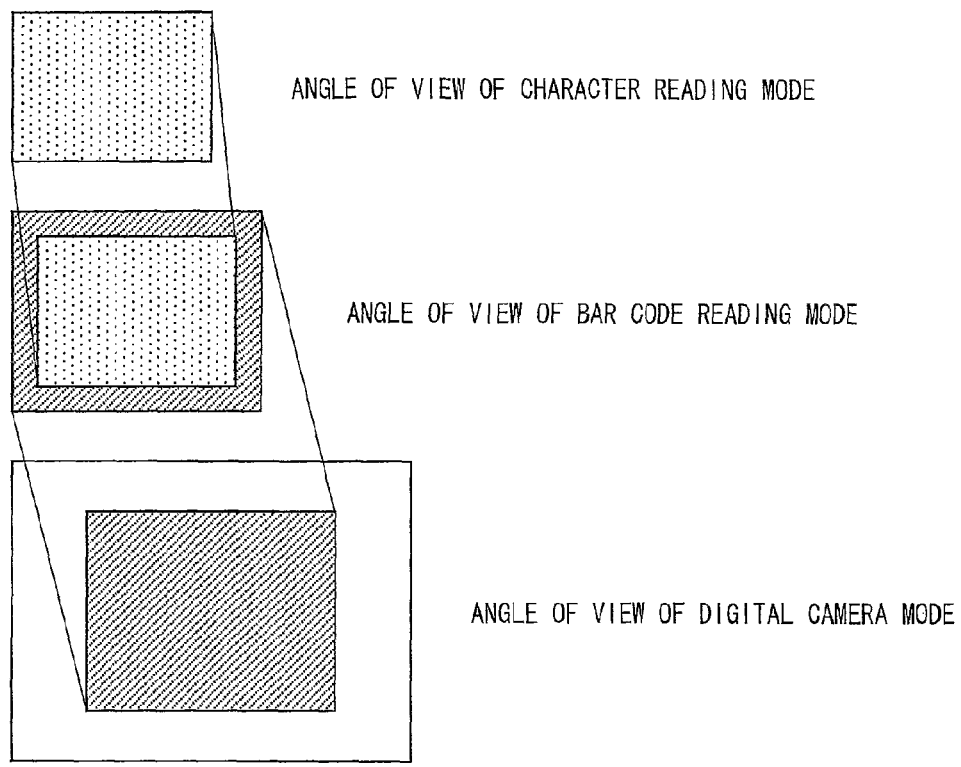
FIG. 5 is a view illustrating angles of view of a character reading mode, a bar code reading mode, and a digital camera mode.

In some cases, a size of an image displayed by the display section 18 varies when the image capturing modes of the image capturing section 19 are switched by the image capturing mode switching section 25. The reason is that, as is illustrated in FIG. 5, the character reading mode, the bar code reading mode, and the digital camera mode have respective different angles of view. FIG. 5 is a view illustrating one example of respective angles of view of the image capturing modes. FIG. 5 shows the respective angles of view of the image capturing modes as an example. Therefore, the angles of view can vary according to a characteristic of an image capturing section of a mobile terminal. Therefore, not all image capturing sections of mobile terminals are capable of switching angles of view as is illustrated in FIG. 5.

In a case where the image capturing section 19 captures an image of a subject in an image capturing mode switched by the image capturing mode switching section 25, and the image obtaining section 22 obtains captured image data, the post-capturing processing section 26 carries out post-processing of the captured image data, in a mode corresponding to the image capturing mode.

In a case where the image capturing section 19 captures an image of a subject in an image capturing mode switched by the image capturing mode switching section 25, post-processing of captured image data obtained by the image obtaining section 22 varies according to which image capturing mode is used for the image capturing section 19 to capture the image.

In view of this, the post-capturing processing section 26 includes: a character reading mode post-processing section 30 for processing captured image data obtained in a case where an image of a subject is captured by the image capturing section 19 in the character reading mode; a bar code reading mode post-processing section 31 for processing captured image data obtained in a case where an image of a subject is captured by the image capturing section 19 in the bar code reading mode; and a digital camera mode post-processing section 32 for processing captured image data obtained in a case where an image of a subject is captured by the image capturing section 19 in the digital camera mode.

The character reading mode post-processing section 30 converts captured image data obtained by the image obtaining section 22 into text data. The character reading mode post-processing section 30 may cause the display section 18 to display converted text data, or store the converted text data in the memory section 17.

The bar code reading mode post-processing section 31 reads out information from a one-dimensional or two-dimensional bar code, which is captured in captured image data obtained by the image obtaining section 22. The bar code reading mode post-processing section 31 may cause the display section 18 to display information thus read out from a one-dimensional or two-dimensional bar code. Alternatively, the bar code reading mode post-processing section 31 may store the information in the memory section 17. Alternatively, the bar code reading mode post-processing section 31 may transmit the information to the outside via the data processing section 15, the wireless processing section 11, and the antenna section 10.

The digital camera mode post-processing section 32 causes the display section 18 to display captured image data obtained by the image obtaining section 22, and stores the captured image data in the memory section 17. As described above, the post-capturing processing section 26 carries (i) out post-processing of captured image data obtained by the image obtaining section 22, in a mode corresponding to an image capturing mode determined to be suitable for a subject by the image capturing mode determination section 24, and (ii) various kinds of outputting.

In the present embodiment, the mobile terminal 1 can include a memory section for storing an image capturing mode determined to be suitable for a subject by the image capturing mode determination section 24. This allows the image capturing section 19 to capture, in a next image capturing, an image of a subject in an image capturing mode stored in the memory section.

In a case where the image capturing section 19 sequentially captures images, the arrangement above allows the image capturing section 19 to capture the images, without causing the image capturing mode determination section 24 to determine, for each image capturing, which one of the plurality of image capturing modes corresponds to determination-use image data indicative of a subject. Therefore, the mobile terminal 1 of the present embodiment can sequentially capture images, without carrying out complicated operation, i.e., without determining, for each image capturing, an image capturing mode suitable for a subject.

The following describes a first example and a second example of processing of the mobile terminal 1 of the present embodiment, with reference to FIGS. 6 through 11.

First Example of Processing

Figure 6:
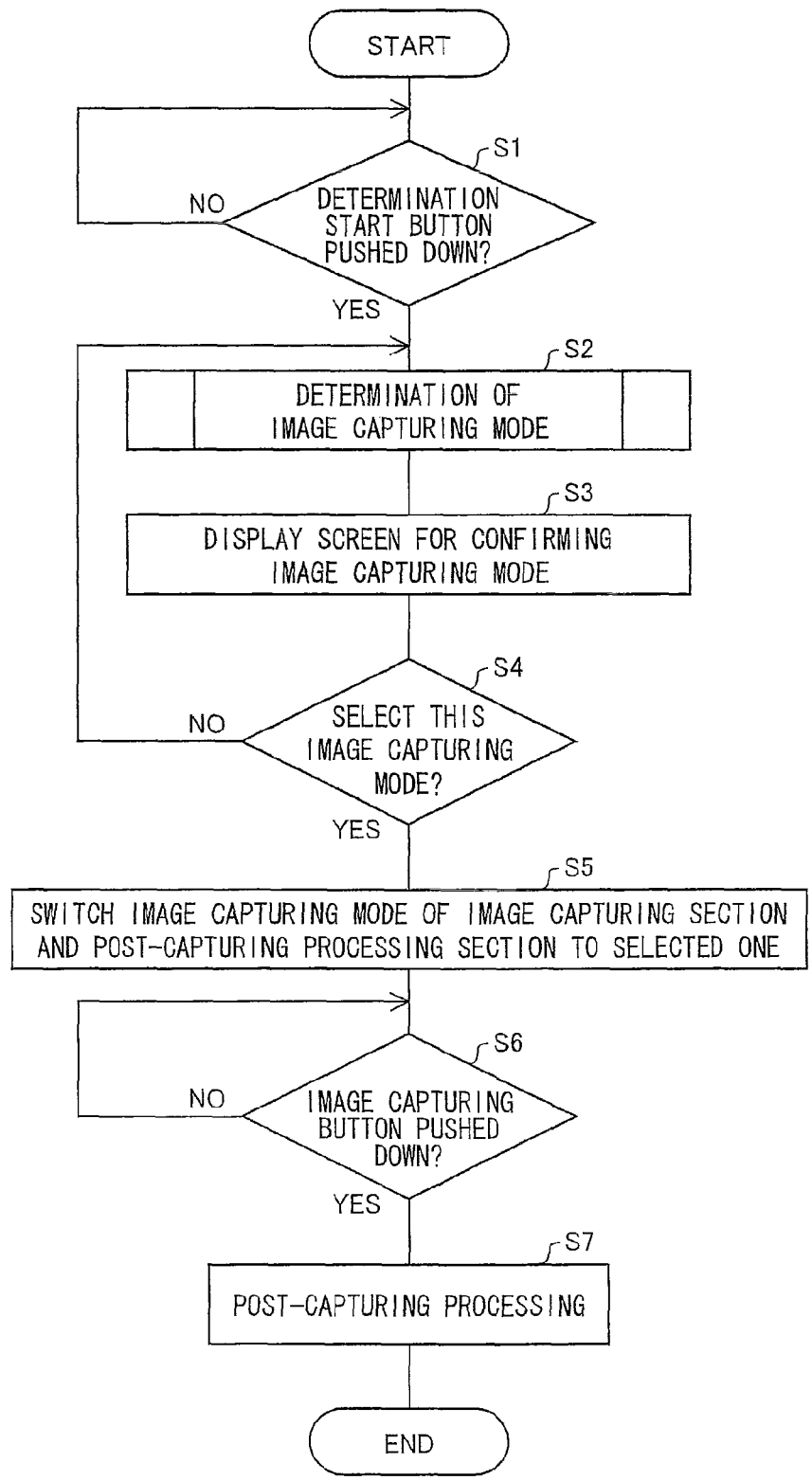
FIG. 6 is a flowchart illustrating a first example of processing of a mobile terminal having the main part of the first embodiment.

The following describes the first example of the processing of the mobile terminal 1 having the main part described in the first embodiment, with reference to FIG. 6. FIG. 6 is a flowchart illustrating the first example of the processing of the mobile terminal having the main part described in the first embodiment.

The main control section 21 of the mobile terminal 1 causes the image capturing section 19 to start so that a lens of the image capturing section 19 focuses on a subject. In the present example, the main control section 21 causes the lens of the image capturing section 19 to focus on a subject. However, the present invention is not limited to this. For example, in a case where a fixed-focus camera is used as the image capturing section 19, the main control section 21 is not required to cause the lens of the image capturing section 19 to focus on a subject.

The image obtaining section 22 determines whether or not the image obtaining section 22 has received, via the operation section 16, a user's pushing down of the determination start button (S1). If the image obtaining section 22 determines that the image obtaining section 22 has received, via the operation section 16, the user's pushing down of the determination start button (Yes in S1), the image obtaining section 22 obtains determination-use image data from a live view image captured by the image capturing section 19, and the image capturing mode determination section 24 determines which one of the plurality of image capturing modes is suitable for the determination-use image data (S2).

If No in S1, S1 is carried out again.

The image capturing mode determination section 24 causes the display section 18 to display an image capturing mode determined to be suitable (S3). This allows a user to determine whether or not the image capturing mode determined to be suitable by the image capturing mode determination section 24 is suitable for the subject (S4).

If the user determines that the image capturing mode determined to be suitable by the image capturing mode determination section 24 is suitable for the subject (Yes in S4), the image capturing mode switching section 25 switches an image capturing mode of the image capturing section 19 to one thus determined, and switches a post-processing mode of the post-capturing processing section 26 to one corresponding to the image capturing mode thus determined (S5). If No in S4, S2 is carried out again.

The image obtaining section 22 determines whether or not the image obtaining section 22 has received, via the operation section 16, a user's pushing down of the shutter button (S6). If the image obtaining section 22 determines that the image obtaining section 22 has received, via the operation section 16, the user's pushing down of the shutter button (Yes in S6), the image obtaining section 22 obtains captured image data from a live view image captured by the image capturing section 19. Then, the post-capturing processing section 26 carries out post-capturing processing of the captured image data obtained by the image obtaining section 22, in a mode corresponding to the image capturing mode determined by the image capturing mode determination section 24 (S7).

If No in S6, S6 is carried out again.

Figure 7:
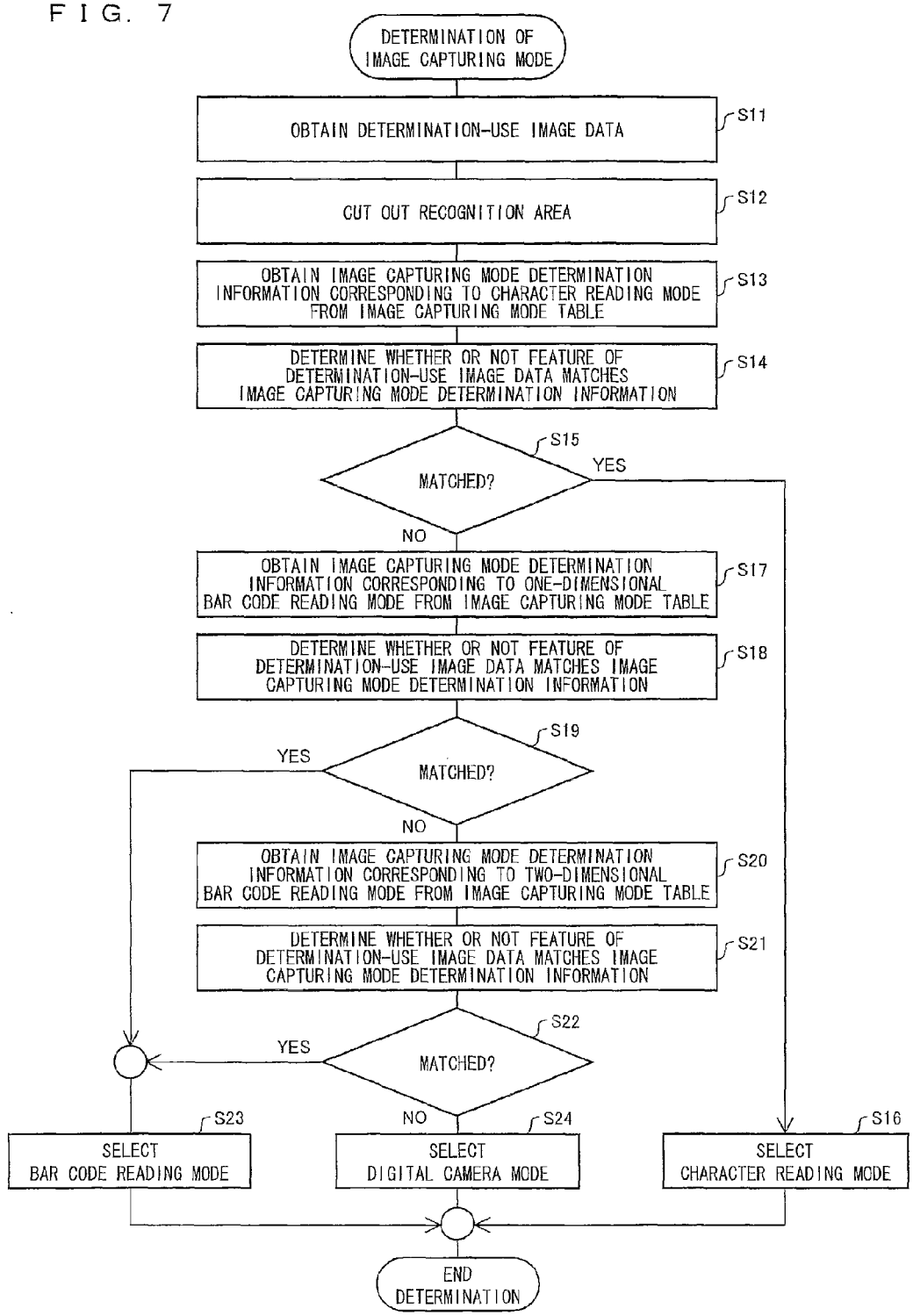
FIG. 7 is a flowchart illustrating concrete processing of "determination of an image capturing mode" in the processing of the first example.

With reference to FIG. 7, the following describes concrete processing of "determination of an image capturing mode," which is carried out in S2 of FIG. 6. FIG. 7 is a flowchart illustrating the concrete processing of the "determination of an image capturing mode."

First, if the image obtaining section 22 receives, via the operation section 16, a user's pushing down of the determination start button, the image obtaining section 22 obtains determination-use image data from a live view image captured by the image capturing section 19 (S11). The recognition area cutout section 23 cuts out, from the determination-use image data obtained by the image obtaining section 23, the predetermined recognition area to be used for determining an image capturing mode (S12).

Then, the character specifying section 27 of the image capturing mode determination section 24 obtains a piece of capturing mode determination information which corresponds to the character reading mode, from the image capturing mode determination table stored in the memory section 17 (S13). The character specifying section 27 determines whether or not a feature of an image within the recognition area cut out from the determination-use image data by the recognition area cutout section 23 matches the piece of capturing mode determination information thus obtained (S14).

If the character specifying section 27 determines that the feature of the image within the recognition area of the determination-use image data matches the piece of capturing mode determination information thus obtained (Yes in S15), the image capturing mode determination section 24 determines that an image capturing mode suitable for the subject is the character reading mode (S16). If No in S15, the one-dimensional bar code specifying section 28 of the image capturing mode determination section 24 obtains a piece of capturing mode determination information which corresponds to the bar code reading mode (one dimension), from the image capturing mode determination table stored in the memory section 17 (S17). Then, the one-dimensional bar code specifying section 28 determines whether or not the feature of the image within the recognition area cut out from the determination-use image data by the recognition area cutout section 23 matches the piece of capturing mode determination information thus obtained (S18).

If the one-dimensional bar code specifying section 28 determines that the feature of the image within the recognition area of the determination-use image data does not match the piece of capturing mode determination information thus obtained (No in S19), the two-dimensional bar code specifying section 29 of the image capturing mode determination section 24 obtains a piece of capturing mode determination information which corresponds to the bar code reading mode (two dimension), from the image capturing mode determination table stored in the memory section 17 (S20). The two-dimensional bar code specifying section 29 determines whether or not the feature of the image within the recognition area cut out from the determination-use image data by the recognition area cutout section 23 matches the piece of capturing mode determination information thus obtained (S21).

If the one-dimensional bar code specifying section 28 determines that the feature of the image within the recognition area of the determination-use image data matches the piece of capturing mode determination information thus obtained which corresponds to the bar code reading mode (one dimension) (Yes in S19), or if the two-dimensional bar code specifying section 29 determines that the feature of the image within the recognition area of the determination-use image data matches the piece of capturing mode determination information thus obtained which corresponds to the bar code reading mode (two dimension) (Yes in S22), the image capturing mode determination section 24 determines that an image capturing mode suitable for the subject is the bar code reading mode (S23).

If No in S22, the image capturing mode determination section 24 determines that an image capturing mode suitable for the subject is the digital camera mode (S24).

In the present embodiment, processes of determining an image capturing mode are carried out in a case where the image obtaining section 22 receives, via the operation section 16, a user's pushing down of the determination start button. However, the present embodiment is not limited to this but can be arranged such that the processes of determining an image capturing mode can be stared at timing when the main control section 21 starts the image capturing section 19.

Second Example of Processing

Figure 8:
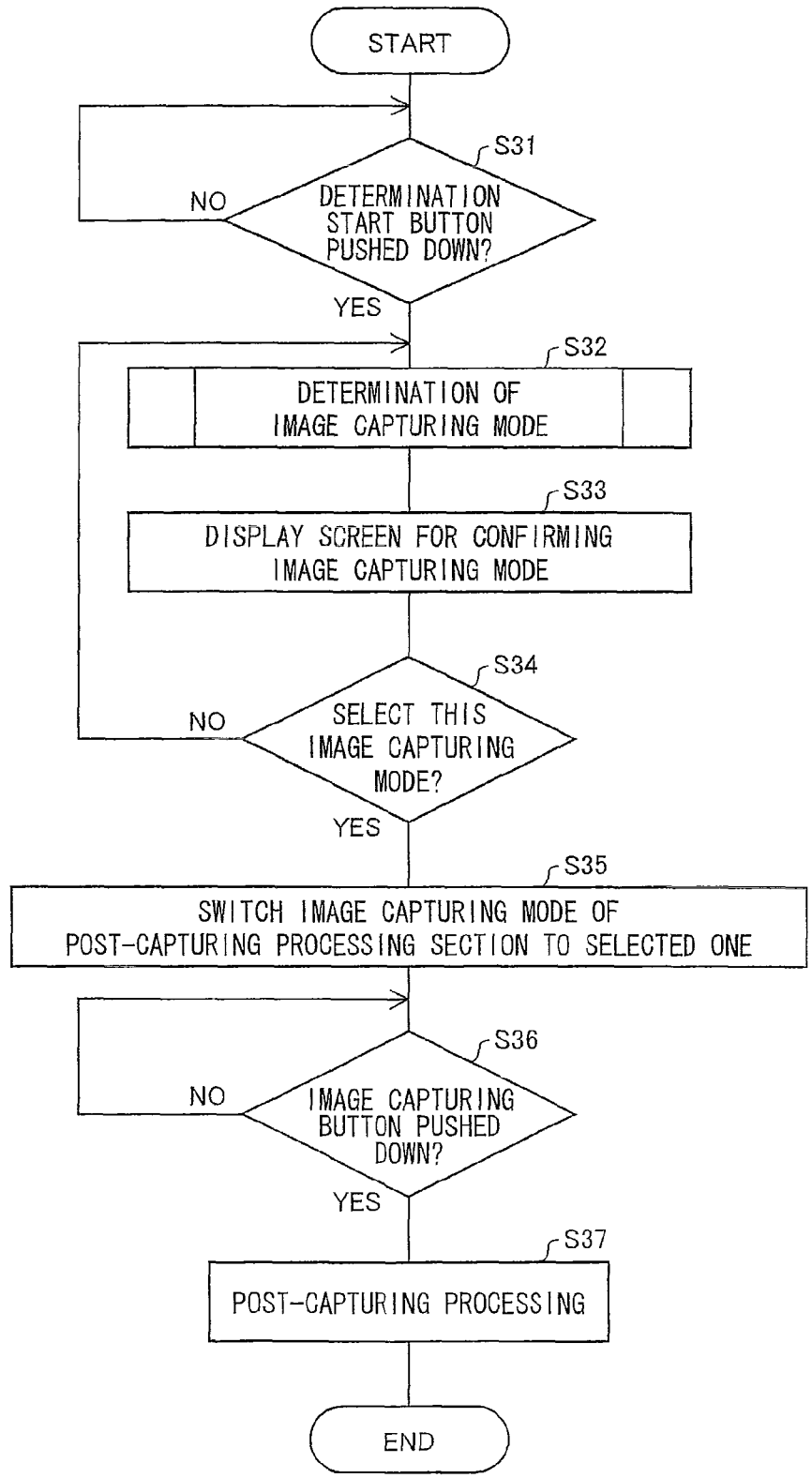
FIG. 8 is a flowchart illustrating a second example of the processing of the mobile terminal having the main part of the first embodiment.

The following describes the second example of the processing of the mobile terminal 1 having the main part described in the first embodiment, with reference to FIG. 8. FIG. 8 is a flowchart illustrating the second example of the processing of the mobile terminal 1 having the main part described in the first embodiment.

In S5 of the first example, an image capturing mode of the image capturing section 19 is switched to a determined one, and a post-processing mode of the post-capturing processing section 26 is also switched to one corresponding to the determined image capturing mode. In contrast, in S35 of the present example, which corresponds to S5 of the first example, only a post-processing mode of the post-capturing processing section 26 is switched to one corresponding to a determined image capturing mode, as is illustrated in FIG. 8.

This is because, according to the processing of the present example, there is no need to switch image capturing modes of the image capturing section 19 after an image capturing mode suitable for determination-use image data is determined, for the reason that, an image capturing mode of the image capturing section 19 is switched to another every time whether or not a feature of an image within a recognition area of determination-use image data matches a piece of capturing mode determination information is determined in "determination of an image capturing mode" in S32.

Descriptions of S31, S33, S34, S36 and S37 of the present example which are illustrated in FIG. 8 are omitted below because they are the same as S1, S3, S4, S6, and S7 of the first example, respectively.

Figure 9:
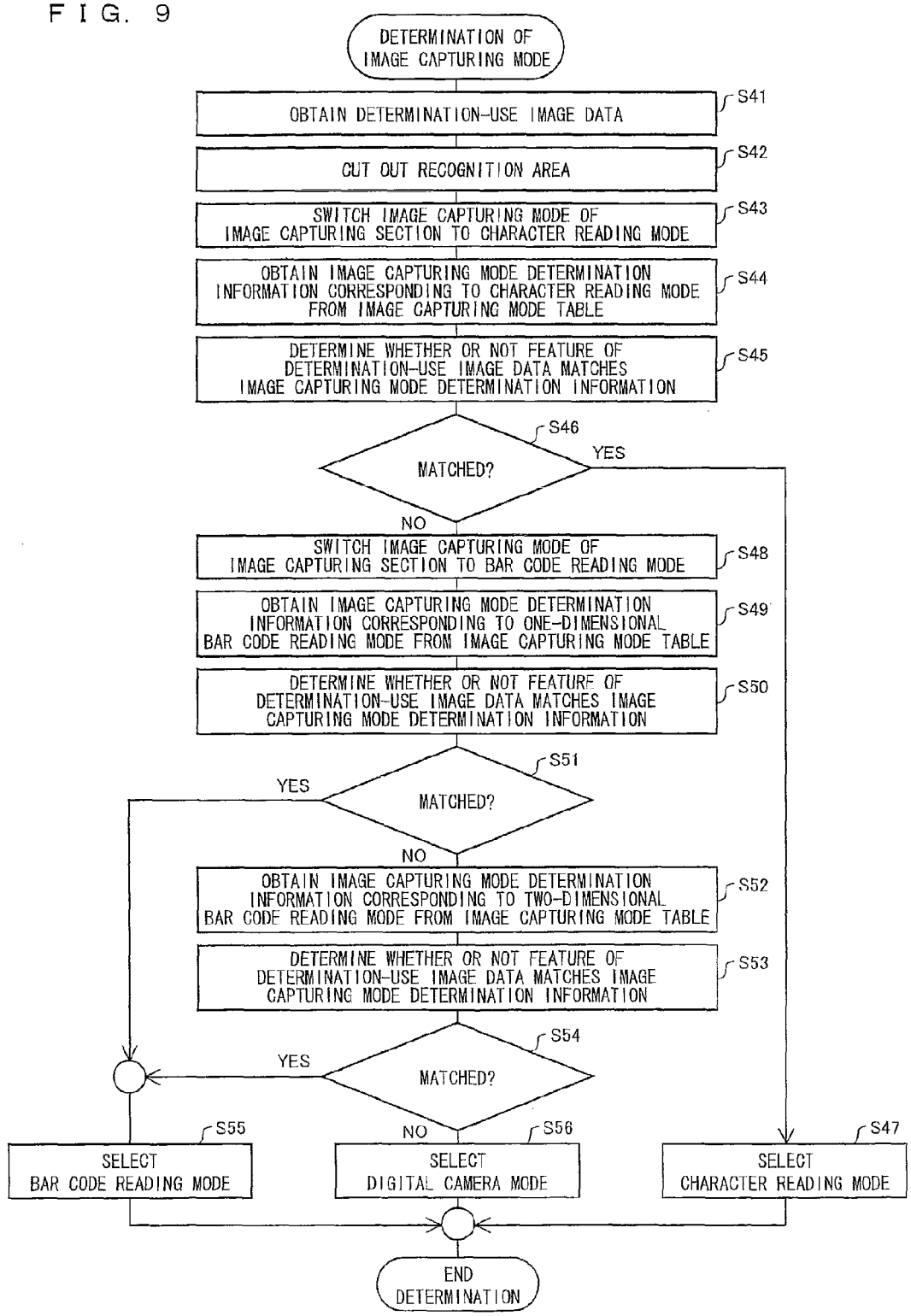
FIG. 9 is a flowchart illustrating concrete processing of "determination of an image capturing mode" in the processing of the second example.

The following describes concrete processing of "determination of an image capturing mode" in S32 of the present example, with reference to FIG. 9. FIG. 9 is a flowchart illustrating the concrete processing of the "determination of an image capturing mode" in S32 of the second example.

First, if the image obtaining section 22 receives, via the operation section 16, a user's pushing down of the determination start button, the image obtaining section 22 obtains determination-use image data from a live view image captured by the image capturing section 19 (S41). The recognition area cutout section 23 cuts out, from the determination-use image data obtained by the image obtaining section 22, the predetermined recognition area to be used for determining an image capturing mode (S42).

Then, the image capturing mode switching section 25 switches an image capturing mode of the image capturing section 19 to the character reading mode (S43). Then, the character specifying section 27 of the image capturing mode determination section 24 obtains a piece of capturing mode determination information which corresponds to the character reading mode, from the image capturing mode determination table stored in the memory section 17 (S44). The character specifying section 27 determines whether or not a feature of an image within the recognition area cut out from the determination-use image data by the recognition area cutout section 23 matches the piece of capturing mode determination information thus obtained (S45).

If the character specifying section 27 determines that the feature of the image within the recognition area of the determination-use image data matches the piece of capturing mode determination information thus obtained (Yes in S46), the image capturing mode determination section 24 determines that an image capturing mode suitable for the subject is the character reading mode (S47).

If the character specifying section 27 determines that the feature of the image within the recognition area of the determination-use image data does not match the piece of capturing mode determination information thus obtained (No in S46), the image capturing mode switching section 25 switches an image capturing mode of the image capturing section 19 to the bar code reading mode (S48). Then, the one-dimensional bar code specifying section 28 of the image capturing mode determination section 24 obtains a piece of capturing mode determination information which corresponds to the bar code reading mode (one dimension), from the image capturing mode determination table stored in the memory section 17 (S49). Then, the one-dimensional bar code specifying section 28 determines whether or not the feature of the image within the recognition area cut out from the determination-use image data by the recognition area cutout section 23 matches the piece of capturing mode determination information thus obtained (S50).

If the one-dimensional bar code specifying section 28 determines that the feature of the image within the recognition area of the determination-use image data does not match the piece of capturing mode determination information thus obtained (No in S51), the two-dimensional bar code specifying section 29 of the image capturing mode determination section 24 obtains a piece of capturing mode determination information which corresponds to the bar code reading mode (two dimension), from the image capturing mode determination table stored in the memory section 17 (S52). The two-dimensional bar code specifying section 29 determines whether or not the feature of the image within the recognition area cut out from the determination-use image data by the recognition area cutout section 23 matches the piece of capturing mode determination information thus obtained (S53).

If the one-dimensional bar code specifying section 28 determines that the feature of the image within the recognition area of the determination-use image data matches the piece of capturing mode determination information thus obtained which corresponds to the bar code reading mode (one dimension) (Yes in S51), or if the two-dimensional bar code specifying section 29 determines that the feature of the image within the recognition area of the determination-use image data matches the piece of capturing mode determination information thus obtained which corresponds to the bar code reading mode (two dimension) (Yes in S54), the image capturing mode determination section 24 determines that an image capturing mode suitable for the subject is the bar code reading mode (S55).

If No in S54, the image capturing mode determination section 24 determines that an image capturing mode suitable for the subject is the digital camera mode (S56).

Second Embodiment of Main Part of Mobile Terminal 1

Figure 10:
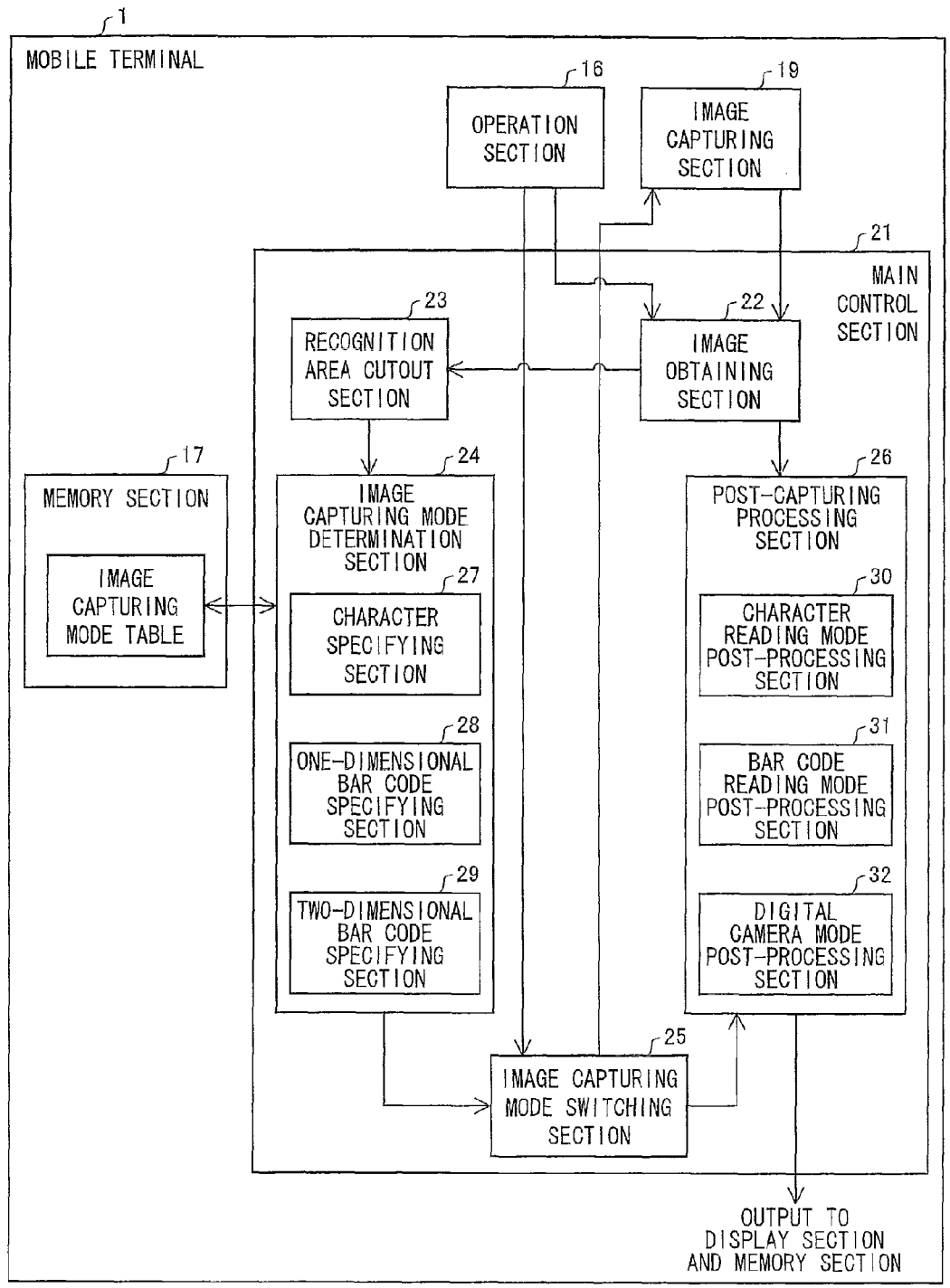
FIG. 10 is a block diagram illustrating an arrangement of a second embodiment of the main part of the mobile terminal.
Figure 11:
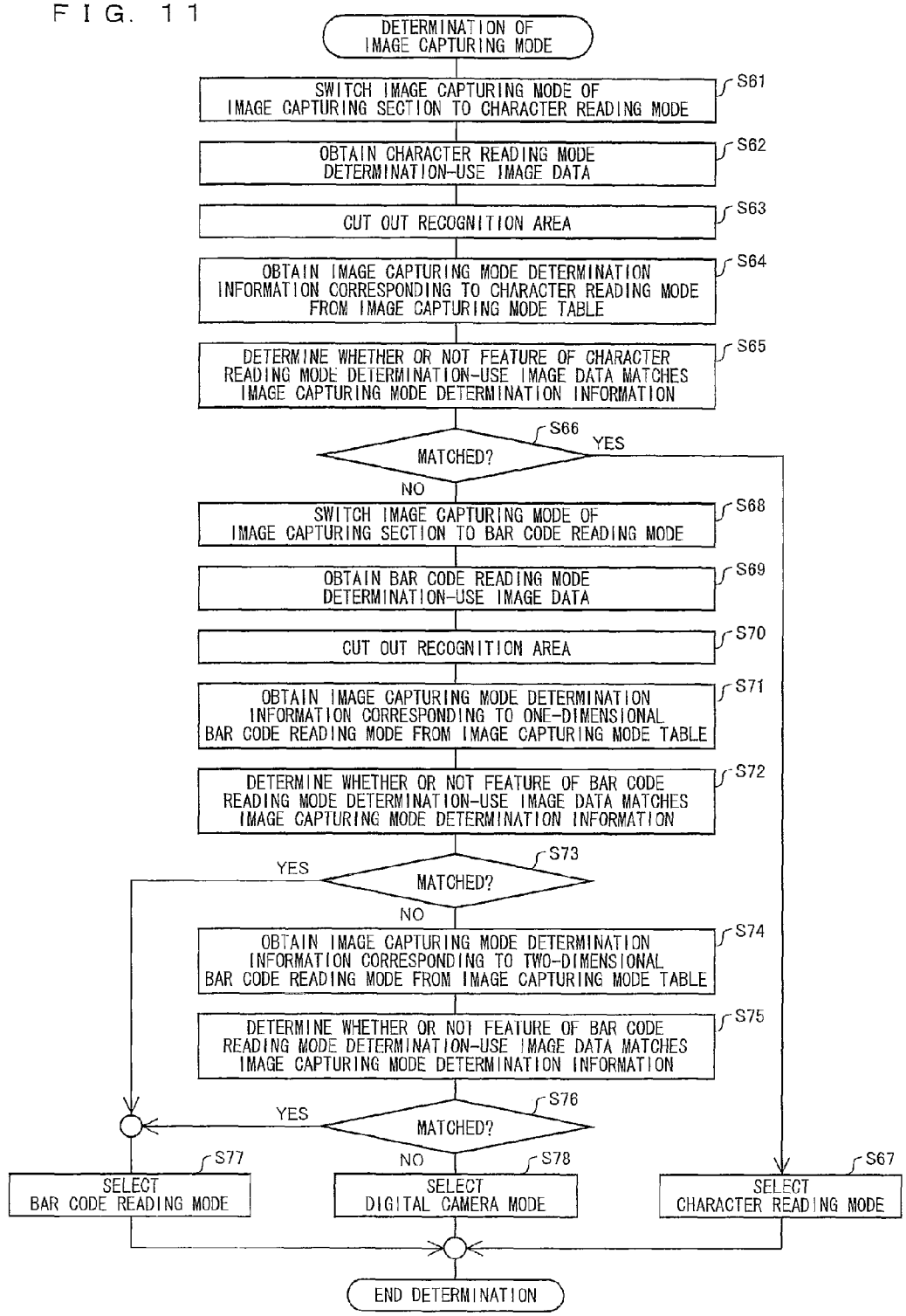
FIG. 11 is a flowchart illustrating concrete processing of "determination of an image capturing mode" in the processing of the second example.

The following describes a second embodiment of the main part of the mobile terminal 1, with reference to FIGS. 10 and 11. FIG. 10 is a block diagram illustrating an arrangement of the second embodiment of the main part of the mobile terminal 1.

The second embodiment is different from the first embodiment in that the operation section 16 of the second embodiment is connected not only to the image obtaining section 22 but also to the image capturing mode switching section 25. In the present embodiment, if the image capturing mode switching section 25 receives, via the operation section 16, a user's pushing down of the determination start button, the image capturing mode switching section 25 switches image capturing modes of the image capturing section 19 in accordance with the sequence stored in the image capturing mode determination table.

Description of the second embodiment of the main part of the mobile terminal 1 is omitted below because the second embodiment is the same as the first embodiment, except that the operation section 16 of the second embodiment is connected also to the image capturing mode switching section 25.

The following describes processing of the mobile terminal 1 having the main part of the second embodiment. The processing of the present embodiment is the same as the processing carried out in S31 through S37 of the second example of the mobile terminal 1 having the main part of the first embodiment illustrated in FIG. 8, except that: as is the case with the "determination of an image capturing mode" in S32 of the second example, an image capturing mode of the image capturing section 19 is switched to another every time whether or not a feature of an image within a recognition area of determination-use image data matches a piece of capturing mode determination information is determined; and furthermore, the image capturing section 19 captures an image of a subject every time image capturing modes of the image capturing section 19 are switched.

The following describes concrete processing of the "determination of an image capturing mode," which is carried out in S32 of the present embodiment, with reference to FIG. 11. FIG. 11 is a flowchart illustrating the concrete processing of the "determination of an image capturing mode," which is carried out in S32 of the present embodiment.

First, if the image capturing mode switching section 25 receives, via the operation section 16, a user's pushing down of the determination start button, the image capturing mode switching section 25 switches an image capturing mode of the image capturing section 19 to the character reading mode (S61). Then, the image obtaining section 22 obtains character reading mode determination-use image data from a live view image captured by the image capturing section 19 (S62). The recognition area cutout section 23 cuts out, from the character reading mode determination-use image data obtained by the image obtaining section 22, the predetermined recognition area to be used for determining an image capturing mode (S63).

Then, the character specifying section 27 of the image capturing mode determination section 24 obtains a piece of capturing mode determination information which corresponds to the character reading mode, from the image capturing mode determination table stored in the memory section 17 (S64). The character specifying section 27 determines whether or not a feature of an image within the recognition area cut out from the character reading mode determination-use image data by the recognition area cutout section 23 matches the piece of capturing mode determination information thus obtained (S65).

If the character specifying section 27 determines that the feature of the image within the recognition area of the character reading mode determination-use image data matches the piece of capturing mode determination information thus obtained (Yes in S66), the image capturing mode determination section 24 determines that an image capturing mode suitable for the subject is the character reading mode (S67).

If the character specifying section 27 determines that the feature of the image within the recognition area of the character reading mode determination-use image data does not match the piece of capturing mode determination information thus obtained (No in S66), the image capturing mode switching section 25 switches an image capturing mode of the image capturing section 19 to the bar code reading mode (S68). Then, the image obtaining section 22 obtains bar code reading mode determination-use image data from the live view image captured by the image capturing section 19 (S69). The recognition area cutout section 23 cuts out, from the bar code reading mode determination-use image data obtained by the image obtaining section 22, the predetermined recognition area to be used for determining an image capturing mode (S70).

Then, the one-dimensional bar code specifying section 28 of the image capturing mode determination section 24 obtains a piece of capturing mode determination information which corresponds to the bar code reading mode (one dimension), from the image capturing mode determination table stored in the memory section 17 (S49). Then, the one-dimensional bar code specifying section 28 determines whether or not the feature of the image within the recognition area cut out from the bar code reading mode determination-use image data by the recognition area cutout section 23 matches the piece of capturing mode determination information thus obtained (S72).

If the one-dimensional bar code specifying section 28 determines that the feature of the image within the recognition area of the determination-use image data does not match the piece of capturing mode determination information thus obtained (No in S73), the two-dimensional bar code specifying section 29 of the image capturing mode determination section 24 obtains a piece of capturing mode determination information which corresponds to the bar code reading mode (two dimension), from the image capturing mode determination table stored in the memory section 17 (S74). The two-dimensional bar code specifying section 29 determines whether or not the feature of the image within the recognition area cut out from the bar code reading mode determination-use image data by the recognition area cutout section 23 matches the piece of capturing mode determination information thus obtained (S75).

If the one-dimensional bar code specifying section 28 determines that the feature of the image within the recognition area of the bar code reading mode determination-use image data matches the piece of capturing mode determination information thus obtained which corresponds to the bar code reading mode (one dimension) (Yes in S73), or if the two-dimensional bar code specifying section 29 determines that the feature of the image within the recognition area of the bar code reading mode determination-use image data matches the piece of capturing mode determination information thus obtained which corresponds to the bar code reading mode (two dimension) (Yes in S76), the image capturing mode determination section 24 determines that an image capturing mode suitable for the subject is the bar code reading mode (S77).

If No in S76, the image capturing mode determination section 24 determines that an image capturing mode suitable for the subject is the digital camera mode (S78).

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Finally, the blocks of the mobile terminal 1, in particular, the image obtaining section 22, the image capturing mode determination section 24, the image capturing mode switching section 25, and the post-capturing processing section 26 may be realized by way of hardware or software as executed by a CPU as follows:

The mobile terminal 1 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the mobile terminal 1 a computer-readable storage medium containing control program code (executable program, intermediate code program, or source program) for the mobile terminal 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The mobile terminal 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

In order to attain the object, as described above, a mobile terminal of the present invention includes: image capturing means; image obtaining means for obtaining a subject image captured by the image capturing means; and image capturing mode determination means for determining which one of a plurality of image capturing modes is suitable for the subject image thus obtained by the image obtaining means, the image capturing means capturing a subject image in an image capturing mode determined to be suitable by the image capturing mode determination means.

The arrangement makes it possible to automatically recognize a subject and easily switch an image capturing mode of the image capturing means to one suitable for the subject, even in a case where the subject is one, such as a character, a bar code, or a color code, which cannot be recognized without using a special image capturing mode.

The mobile terminal of the present invention may include first image capturing mode switching means for switching an image capturing mode of the image capturing means to the image capturing mode determined to be suitable by the image capturing mode determination means.

The first image capturing mode switching means of the mobile terminal of the present invention can switch an image capturing mode of the image capturing means to one determined to be suitable by the image capturing mode determination means. Therefore, the mobile terminal of the present invention can automatically switch an image capturing mode of the image capturing means to one suitable for a subject, without requiring a user to manually switch image capturing modes. This eliminates a complex operation required for a conventional mobile terminal.

The mobile terminal of the present invention may be arranged such that the image capturing mode determination means performs the determination for each of the plurality of image capturing modes which are sequentially selected one by one by a second image capturing mode switching means; and the second image capturing mode switching means stops thus selecting the plurality of image capturing modes of the image capturing means in a case where an image capturing mode being selected by the second image capturing mode switching means is determined to be suitable by the image capturing mode determination means.

The second image capturing mode switching means of the present invention switches image capturing modes of the image capturing means at timing which is different from that of the first image capturing mode switching means. However, the arrangement above of the present invention makes it possible to automatically switch an image capturing mode of the image capturing means to one suitable for a subject, without requiring a user to manually switch image capturing means, as is the case where image capturing modes of the image capturing means are switched by the first image capturing mode switching means. This makes it possible to eliminate a complex operation required for a conventional mobile terminal.

The mobile terminal of the present invention may be arranged such that the image obtaining means obtains the subject image captured by the image capturing means being in an image capturing mode selected by the second image capturing mode switching means.

The arrangement makes it possible to automatically switch an image capturing mode of the image capturing means to one suitable for a subject, without requiring a user to manually switch image capturing modes. This eliminates a complex operation required for a conventional mobile terminal.

The mobile terminal of the present invention may include recognition area cutout means for cutting out, from the subject image obtained by the image obtaining means, a predetermined recognition area to be used for determining which one of the plurality of image capturing modes is suitable.

In a case where the image capturing mode determination means selects an image capturing mode suitable for a subject by determining which one of the plurality of image capturing modes corresponds to a whole of an image obtained by the image obtaining means, it is difficult to select one image capturing mode if a plurality of subjects corresponding to respective different image capturing modes, e.g., a bar code and a person, are captured in the image.

According to the arrangement of the present invention, the recognition area cutout means cuts out, from the image data obtained by the image obtaining means, the predetermined recognition area to be used for determining an image capturing mode. With the arrangement, capturing a target subject within the recognition area by using the image capturing means makes it possible to select an image capturing mode suitable for the target subject even if a plurality of subjects corresponding to respective different image capturing modes are captured in the image.

The recognition area can be a predetermined area which is displayed by the display means. Alternatively, the recognition area can be freely selected by a user after the image obtaining means obtains an image.

The mobile terminal of the present invention may include: post-capturing processing means for performing post-processing of the subject image in a post-processing mode corresponding to an image capturing mode in which the subject image is captured; and post-capturing processing switching means for switching a post-processing mode of the post-capturing processing means to a post-processing mode corresponding to the image capturing mode determined to be suitable by the image capturing mode determination means.

Post-processing of an image obtained by the image obtaining means differs according to a type of a subject. In a case where a subject is a character for example, an image of the subject is converted into text data. In a case where a subject is a bar code, information contained in the bar code is obtained from the image of the subject. In a case where a subject is a person or a landscape, the image of the subject is stored in the memory.

In consideration of this, the mobile terminal of the present invention is arranged such that the post-capturing processing switching means switches a post-processing mode of the post-capturing processing means to one corresponding to an image capturing mode determined by the image capturing mode determination means to be suitable for the image obtained by the image obtaining means. This makes it possible to properly process the image according to a type of the subject.

The mobile terminal of the present invention may include notification means for notifying a user of the image capturing mode determined to be suitable by the image capturing mode determination means.

The mobile terminal of the present invention is arranged such that the image capturing mode determination means automatically selects an image capturing mode suitable for a subject. According to the arrangement, unfortunately, the image capturing mode determination means may wrongly select an image capturing mode in a case where, determination-use image data obtained by the image obtaining means contains an unclear character or a landscape containing a character or a bar code.

If the image capturing mode determination means wrongly selects an image capturing mode, an image of a subject is captured in the image capturing mode which is not suitable for the subject, as long as the mobile terminal does not have means which allows a user to check an image capturing mode determined to be suitable by the image capturing mode determination means.

In consideration of this, according to the arrangement of the present invention, the mobile terminal includes the notification means for notifying a user of an image capturing mode determined to be suitable by the image capturing mode determination means. This allows a user to know which image capturing mode has been selected. This allows a user to halt start of the image capturing means, and to perform again determination of an image capturing mode, in a case where the user determines that an image capturing mode determined to be suitable by the image capturing mode determination means is not suitable for the subject. This makes it possible to select an image capturing mode suitable for a subject.

The mobile terminal of the present invention may include a memory section for storing information indicative of which image capturing mode is determined to be suitable by the image capturing mode determination means, wherein, in next image capturing, the image capturing means captures a subject image in an image capturing mode indicated by the information stored in the memory section.

In a case where the image capturing means sequentially captures images, the arrangement above allows the image capturing means to capture the images, without causing the image capturing mode determination means to determine, for each image capturing, which one of the plurality of image capturing modes corresponds to the image of a subject. Therefore, the mobile terminal of the present invention can sequentially capture images, without carrying out complicated operation, i.e., without determining, for each image capturing, an image capturing mode suitable for a subject.

A method of the present invention for controlling a mobile terminal, includes the steps of: (a) obtaining a subject image captured by image capturing means, the image capturing means having a plurality of image capturing modes and capturing the subject image in one mode selected from the plurality of image capturing modes; (b) determining which one of the plurality of image capturing modes is suitable for the subject image obtained in the step (a); and (c) capturing a subject image by the image capturing means in an image capturing mode determined in the step (b) to be suitable.

The steps of the control method of the mobile terminal realize the same processes as those carried out by the means of the mobile terminal. Therefore, the steps produce the same working effect as that of the mobile terminal.

The information measurement apparatus and the information management server can be realized by way of a computer. In this case, the present invention encompasses an information management program for realizing, by causing the computer to operate as the means above, the information measurement apparatus and the information management server by way of the computer, and a computer-readable storage medium storing the information management program.

The mobile terminal of the present invention includes: image capturing means; image obtaining means for obtaining a subject image captured by the image capturing means; and image capturing mode determination means for determining which one of a plurality of image capturing modes is suitable for the subject image thus obtained by the image obtaining means, the image capturing means capturing a subject image in an image capturing mode determined to be suitable by the image capturing mode determination means.

The arrangement allows the image capturing mode determination means to determine which one of the plurality of image capturing means is suitable for an image obtained by the image obtaining means, even in a case where a subject is one, such as a character, a bar code, or a color code, which cannot be recognized without switching an image capturing mode of the image capturing means to a special one. This allows the image capturing means to capture an image of a subject in an image capturing mode suitable for the subject.

INDUSTRIAL APPLICABILITY

The mobile terminal of the present invention is suitably applicable to portable terminal devices having image capturing means, e.g., to portable phones such as PDCs (Personal Digital Cellular) and PHSs (Personal Handyphone System), and to portable information terminal devices such as PDAs (Personal Digital Assistant).

The invention claimed is:

1. A mobile terminal comprising:
image capturing means;
image obtaining means for obtaining a subject image captured by the image capturing means;
image capturing mode determination means for determining, on a basis of a feature point in the subject image thus obtained by the image obtaining means, which one of a plurality of image capturing modes is applicable for the subject image,
post-capturing processing means for performing post-capturing processing of the subject image captured by the image capturing means,
the image capturing means capturing the subject image, and capturing the subject image again in an image capturing mode determined, on a basis of the subject image, to be applicable by the image capturing mode determination means, and
the post-capturing processing means switching a post-processing mode to one corresponding to the image capturing mode determined to be applicable by the image capturing mode determination means and performing, in the post-processing mode, post-capturing processing of the subject image captured again by the image capturing means,
if the image capturing mode determination means determines that the character reading mode is applicable, the post-capturing processing is the processing for reading out the character from the subject image, and
if the image capturing mode determination means determines that the bar code reading mode is applicable, the post-capturing processing is the processing for reading out the bar code information from the subject image.

2. The mobile terminal as set forth in claim 1, further comprising:
first image capturing mode switching means for switching an image capturing mode of the image capturing means to the image capturing mode determined to be suitable by the image capturing mode determination means.

3. The mobile terminal as set forth in claim 1, wherein:
the image capturing mode determination means performs the determination for each of the plurality of image capturing modes which are sequentially selected one by one by a second image capturing mode switching means; and
the second image capturing mode switching means stops thus selecting the plurality of image capturing modes of the image capturing means in a case where an image capturing mode being selected by the second image capturing mode switching means is determined to be suitable by the image capturing mode determination means.

4. The mobile terminal as set forth in claim 3, wherein
the image obtaining means obtains the subject image captured by the image capturing means being in an image capturing mode selected by the second image capturing mode switching means.

5. The mobile terminal as set forth in claim 1, further comprising:
recognition area cutout means for cutting out, from the subject image obtained by the image obtaining means, a predetermined recognition area to be used for determining which one of the plurality of image capturing modes is suitable.

6. The mobile terminal as set forth in claim 1, further comprising:
post-capturing processing means for performing post-processing of the subject image in a post-processing mode corresponding to an image capturing mode in which the subject image is captured; and
post-capturing processing switching means for switching a post-processing mode of the post-capturing processing means to a post-processing mode corresponding to the image capturing mode determined to be suitable by the image capturing mode determination means.

7. The mobile terminal as set forth in claim 1, further comprising:
notification means for notifying a user of the image capturing mode determined to be suitable by the image capturing mode determination means.

8. The mobile terminal as set forth in claim 1, further comprising:
a memory section for storing information indicative of which image capturing mode is determined to be suitable by the image capturing mode determination means,
wherein, in next image capturing, the image capturing means captures a subject image in an image capturing mode indicated by the information stored in the memory section.

9. A method for controlling a mobile terminal, comprising the steps of:
(a) obtaining a subject image captured by image capturing means, the image capturing means having a plurality of image capturing modes and capturing the subject image in one mode selected from the plurality of image capturing modes;

(b) determining, on a basis of a feature point in the subject image thus obtained by the image capturing means, which one of the plurality of image capturing modes is applicable for the subject image; and (c) performing post-capturing process of the subject image captured by the image capturing means, the image capturing means capturing the subject image, and capturing the subject image again in an image capturing mode determined, on a basis of the subject image, to be applicable in step (b); and step (c) including switching a post-processing mode to one corresponding to the image capturing mode determined to be applicable in step (b) and performing, in the post-processing mode, post-capturing processing of the subject image captured again by the image capturing means, if the image capturing mode determination means determines that the character reading mode is applicable, the post-capturing processing is the processing for reading out the character from the subject image, and if the image capturing mode determination means determines that the bar code reading mode is applicable, the post-capturing processing is the processing for reading out the bar code information from the subject image.

10. A non-transitory computer-readable storage medium storing a control program, the control program causing a computer to function as a mobile terminal which includes:

image capturing means;

image obtaining means for obtaining a subject image captured by the image capturing means;

image capturing mode determination means for determining, on a basis of a feature point in the subject image thus obtained by the image obtaining means, which one of a plurality of image capturing modes is applicable for the subject image, post-capturing processing means for performing post-capturing processing of the subject image captured by the image capturing means, the image capturing means capturing the subject image, and capturing the subject image again in an image capturing mode determined, on a basis of the subject image, to be applicable by the image capturing mode determination means, and the post-capturing processing means switching a post-processing mode to one corresponding to the image capturing mode determined to be applicable by the image capturing mode determination means and performing, in the post-processing mode, post-capturing processing of the subject image captured again by the image capturing means, if the image capturing mode determination means determines that the character reading mode is applicable, the post-capturing processing is the processing for reading out the character from the subject image, and if the image capturing mode determination means determines that the bar code reading mode is applicable, the post-capturing processing is the processing for reading out the bar code information from the subject image.

\* \* \* \* \*